United States Patent
Tsai et al.

(10) Patent No.: US 8,411,344 B2
(45) Date of Patent: Apr. 2, 2013

(54) ELECTRICAL CONTROL LIGHT VALVE APPARATUS HAVING LIQUID METAL

(75) Inventors: Tsung-Hui Tsai, Taipei (TW); Fu-cheng Wang, Taipei (TW); Chih-Ming Ho, Keelung (TW); Chi-Te Liang, Taipei (TW)

(73) Assignees: National Taiwan University (TW); Tatung University (TW)

( * ) Notice: Subject to any disclaimer, the term of this patent is extended or adjusted under 35 U.S.C. 154(b) by 371 days.

(21) Appl. No.: 12/805,545

(22) Filed: Aug. 5, 2010

(65) Prior Publication Data

US 2011/0194165 A1    Aug. 11, 2011

(30) Foreign Application Priority Data

Feb. 11, 2010   (TW) .............................. 99104267 A

(51) Int. Cl.
*G02B 26/02* (2006.01)

(52) U.S. Cl. ...................................................... 359/228

(58) Field of Classification Search .................. 359/228; 428/411.1
See application file for complete search history.

(56) References Cited

U.S. PATENT DOCUMENTS 6,331,356 B1 * 12/2001 Angelopoulos et al. ... 428/411.1

OTHER PUBLICATIONS

Tsai et al., Jeff T. H., Ultrahigh Contrast Light Valve Driven by Electrocapillarity of Liquid Gallium, Applied Physics Letters, 2009, 251110-1-251110-3, American Institute of Physics, Taiwan.

* cited by examiner

*Primary Examiner* — Euncha Cherry
(74) *Attorney, Agent, or Firm* — Bacon & Thomas, PLLC

(57) ABSTRACT

The present invention discloses an electrical control light valve apparatus having liquid gallium. The invention comprises the transparent glass as a substrate, ITO transparent conductive film as the electrodes, the liquid gallium as the valve located on the ITO transparent conductive film, and the partial-transparent glass is located on the top of the electrical control light valve apparatus.

1 Claim, 5 Drawing Sheets

ELECTRICAL CONTROL LIGHT VALVE APPARATUS HAVING LIQUID METAL

BACKGROUND OF THE INVENTION

1. Field of the Invention

The present invention discloses an electrical control light valve apparatus, particularly to an electrical control light valve apparatus having the liquid metal.

2. Description of the Prior Art

The Thin Film Transistor-Liquid Crystal Display (TFT-LCD) is a kind of flat display technology, and is currently the main product of display in the market. Compared to other flat display technologies, including flat cathode ray tube (CRT) technology, plasma display panel (PDP) technology, back emitting technology, field emitting technology and so on, the TFT-LCD adopts relatively mature semiconductor technology. The Thin Film Transistor capable of controlling light is coated on the transparent glass substrate, and the liquid crystal material with optical rotation characteristics is employed as the display medium, in order to adjust the colour.

The conventional liquid electronic paper normally applies the "electrowetting effect" to regulate the light intensity. The electrowetting effect uses the electric field produced by the electrodes array to change the surface tension of liquid drops in order to control the motion of liquid drops in small channels. The conventional electrical light valve apparatus is shown in FIG. 1. When the voltage is not applied, the state is "close", as illustrated in FIG. 1A. And when the voltage is applied, the state is "open", as illustrated in FIG. 1B. The electrowetting technique mainly utilizes the immiscible property of oil and water, to superpose a hydrophobic insulation layer between the interface of the electrode and the oil drop, in order to form the light valve which can be controlled by the electric field. The hydrophobic insulation layer is used to produce the accumulation of electric charge, which causes the change of surface tension on the oil drop. The passage of light can be determined by the expansion or contraction of the oil drop, and the corresponding "close" or "open" state is formed.

However, due to the characteristic of oil, it can neither totally shield the light, nor totally reflect the light. In addition, when the light valve presents the close state, the contact angle between the oil drop and the hydrophobic insulation layer is not small enough, such that part of the light is penetrated to form light leaking phenomenon. As a result, the light valve is unable to reach high contrast of brightness and darkness, which becomes a major defect of using the liquid electronic paper.

Therefore, in order to produce more effective light valve, it is necessary to develop innovative light valve, so as to improve the power efficiency in the display and to reduce the response time and the manufacturing cost.

SUMMARY OF THE INVENTION

The present invention provides an electrical control light valve apparatus having liquid metal. The liquid metal is controlled by the applied voltage to reach the extension or contraction state. In addition, the liquid metal can totally reflect the light in order to achieve high contrast of brightness and darkness.

The present invention relates an electrical control light valve apparatus having liquid metal. The invention comprises the transparent glass as a substrate, indium tin oxide (ITO) transparent conductive film as the electrodes, the liquid metal as the valve located on the ITO transparent conductive film, and the partial-transparent glass is located on the top of the electrical control light valve apparatus. The transparent conductive solution is injected into the electrode. The partial-transparent glass is used to separate the light transparent area and to define the block of pixels.

When the voltage is not applied, the liquid metal is of round sphere, thus the light can penetrate through the liquid metal to form the significant bright state. When the voltage is applied, the liquid metal is expanded as a film so that the light is shielded. The light can be totally reflected by metal to form the significant dark state.

When the liquid metal of the invention is expanded, the contact angle between the glass substrate and the liquid metal is very small, thus the light can be totally reflected to reach high contrast of brightness and darkness.

The present invention relates to an electrical control light valve apparatus having the liquid metal. It has fast switching speed, which can improve switching time between brightness and darkness.

The present invention relates to an electrical control light valve apparatus having liquid metal. The electrocapillary force generated between upper and lower substrates can be employed to overcome the influence of gravity, so that the invention can be presented vertically.

Therefore, the advantage and spirit of the invention can be understood further by the following detail description of invention and attached Figures.

BRIEF DESCRIPTION OF THE DRAWINGS

The foregoing aspects and many of the attendant advantages of this invention will become more readily appreciated as the same becomes better understood by referring to the following detailed description, when taken in conjunction with the accompanying drawings, wherein.

DESCRIPTION OF THE PREFERRED EMBODIMENT

Figure 1A:
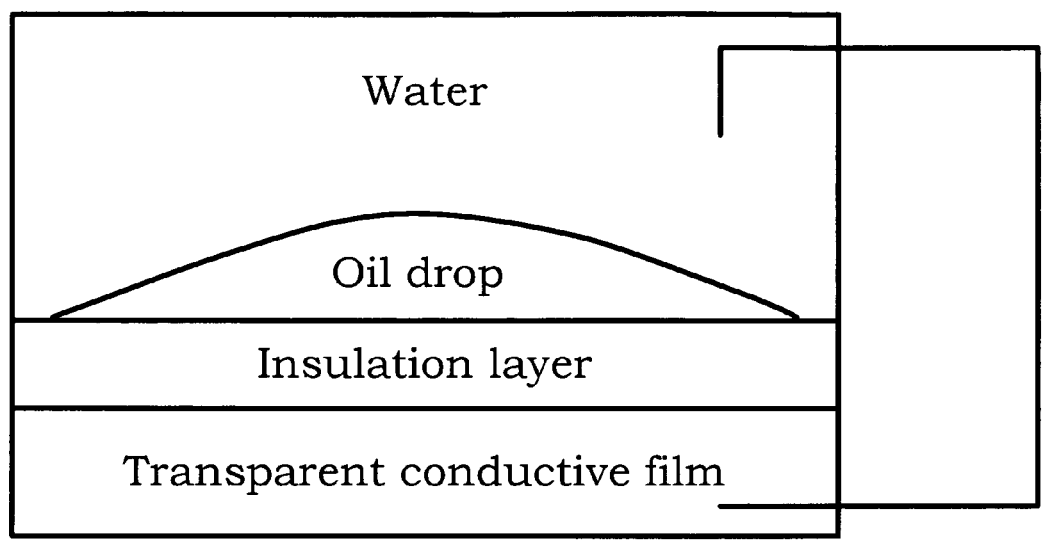
FIG. 1A is a graph illustrating the close state of a conventional electrical control light valve apparatus.
Figure 1B:
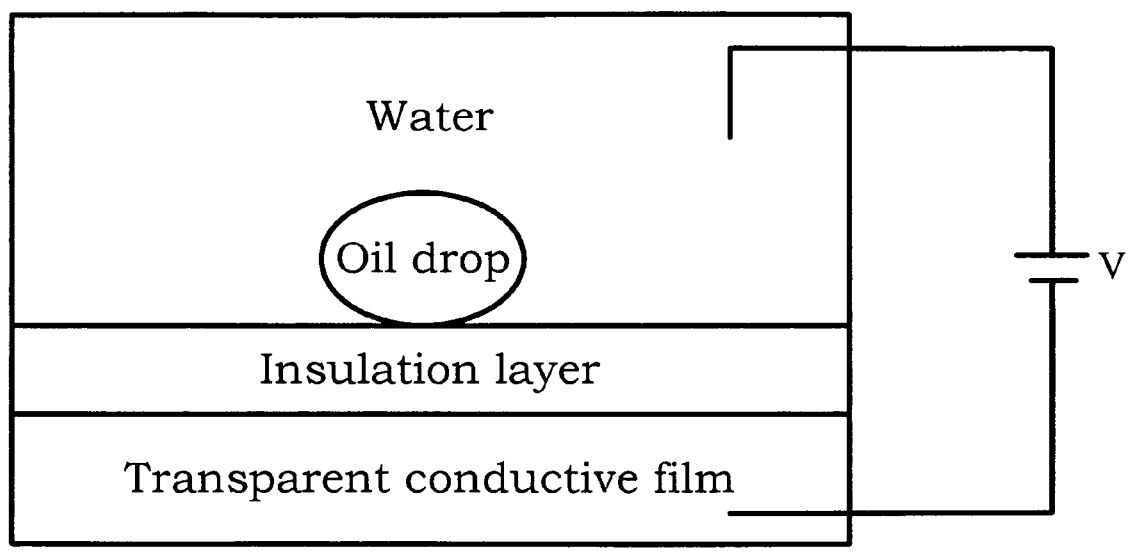
FIG. 1B is a graph illustrating the open state of a conventional electrical control light valve apparatus
Figure 2A:
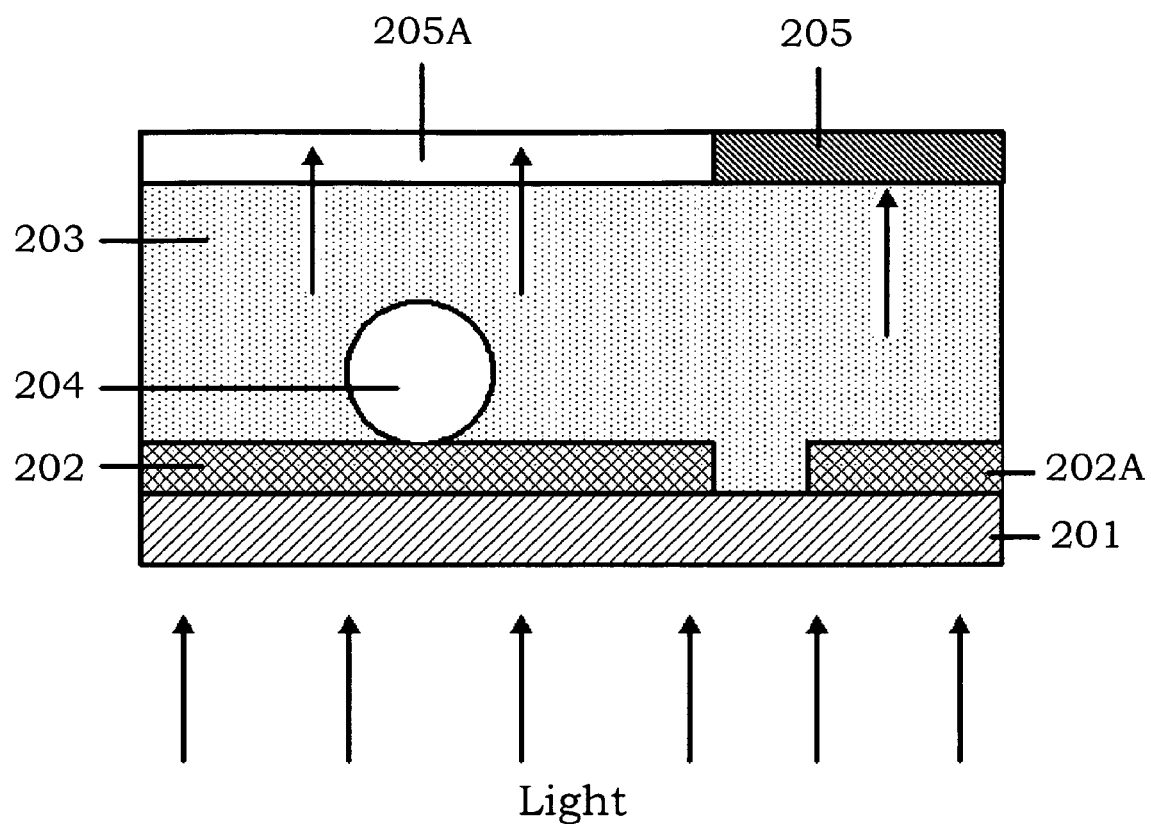
FIG. 2A is a graph illustrating the open state for the embodiment of the invention.

The present invention provides an electrical control light valve apparatus having liquid metal. As shown in FIG. 2A, a bottom flat plate 201 is provided. The bottom flat plate 201 is transparent. This embodiment uses a transparent glass 201 with high transparency. An ITO transparent conductive film 202 is used as the positive electrode. And an ITO transparent conductive film 202A is used as the negative electrode, which are located on the top of transparent glass 201. The transparent conductive solution 203 (such as $H_2SO_4$, HCl etc.) is injected into the electrode. The liquid gallium 204 is placed on the top of ITO transparent conductive film 202. The liquid gallium 204 remains as a sphere when the voltage is not applied. Thus the light can penetrate through the transparent glass 201 and the ITO transparent conductive film 202 into the spherical liquid gallium 204. The light is not shielded by the liquid gallium 204 at this time. The light can penetrate to the other side to form the significant "bright" state. The top flat plate can shield the light. In the embodiment, the opaque glass block 205 and transparent glass block 205A are used as the top flat plate.

Figure 2B:
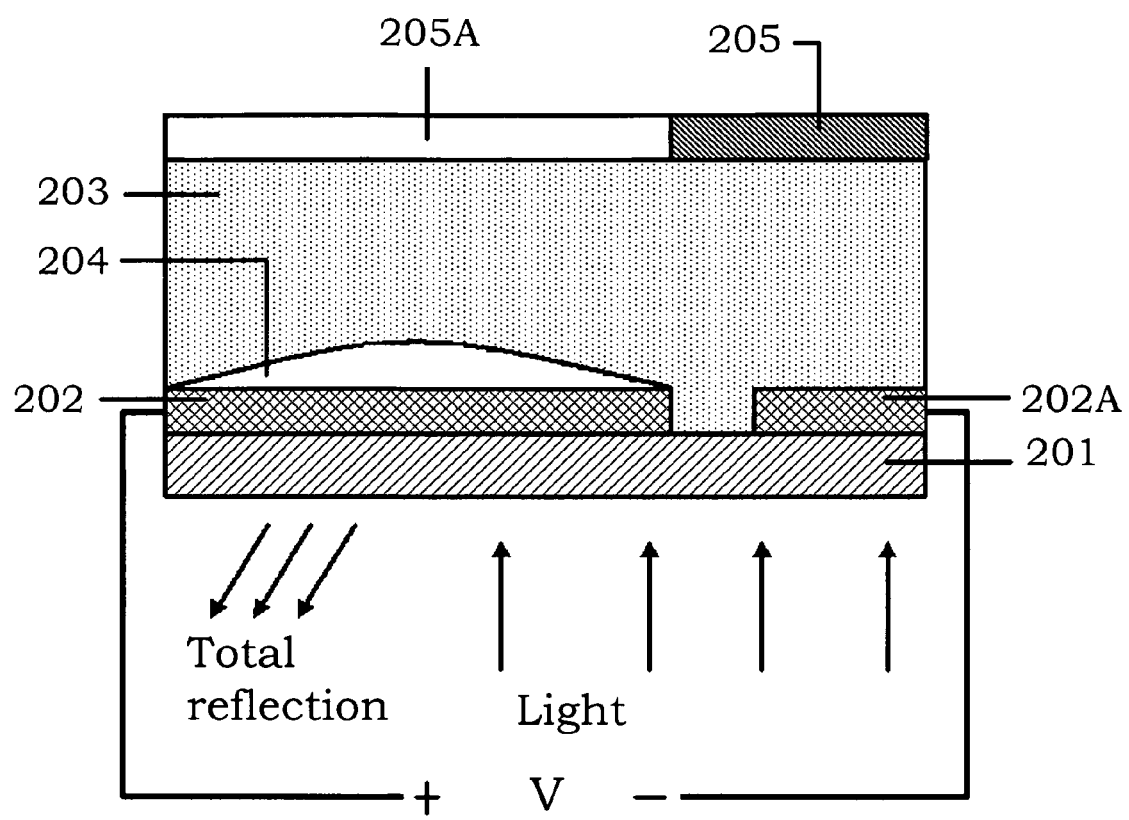
FIG. 2B is a graph illustrating the close state for the embodiment of the invention.

As shown in FIG. 2B, when the voltage is applied, the liquid gallium 204 is expanded as a film. When the light penetrates through the transparent glass 201 and the ITO transparent conductive film 202 into the film-type liquid gallium 204, the light will be shielded. The liquid gallium 204 generates light shielding effect, thus the light cannot penetrate to the other side and the significant "dark" state is formed. The liquid metal of the invention is not limited to the liquid gallium. The liquid metal having the same property and function of liquid gallium can be used in the embodiment of the invention. In other words, other liquid metal can also be used in the embodiment of the invention.

Figure 3:
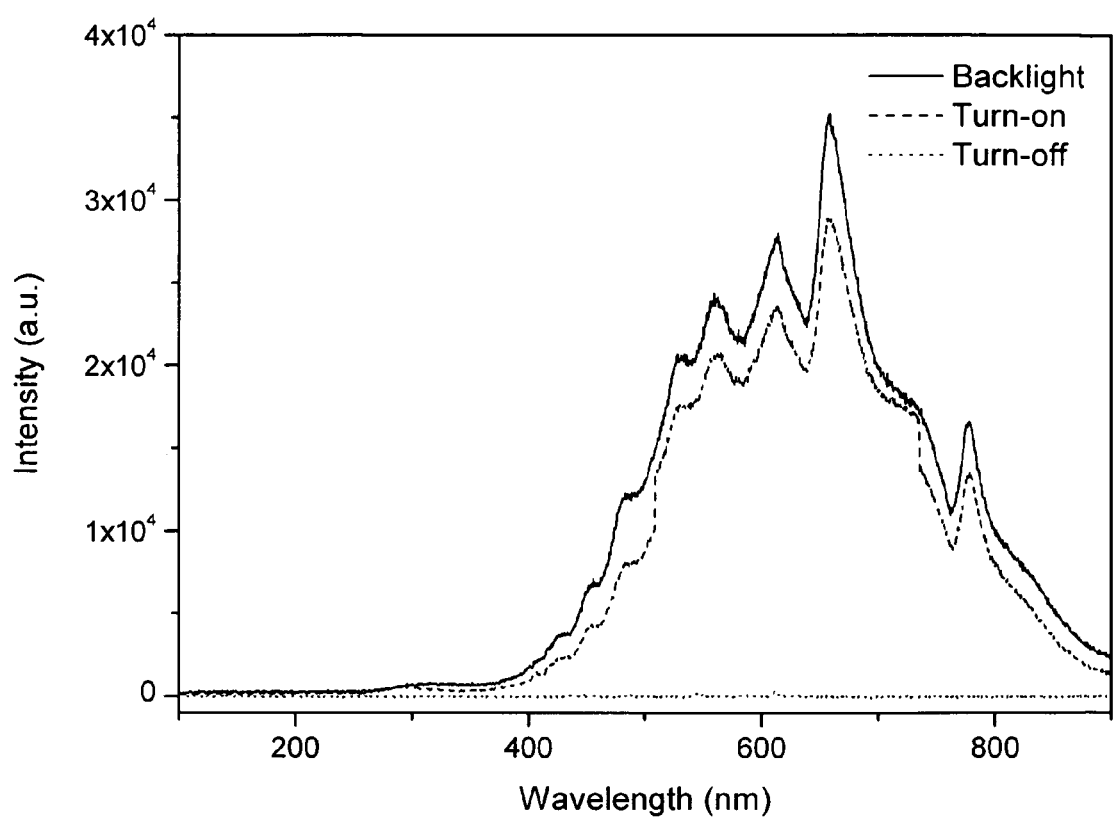
FIG. 3 is a graph illustrating the experimental result of the invention.

FIG. 3 shows the experimental result of the invention. The wavelength is used as the axis of abscissa and the light intensity is used as the axis of ordinate to draw the diagram. It shows that there is high contrast ratio for the electrical control light valve apparatus having the liquid gallium.

When the liquid gallium 204 is expanded by applied voltage, the contact angle between glass substrate and liquid gallium is very small, thus the light can be totally reflected to reach high contrast of brightness and darkness. Furthermore, the switch between the bright and dark states is fast. In addition, the electrocapillary force generated between upper and lower substrates can be employed to overcome the influence of gravity, so that the device can be presented vertically. When the voltage is applied, a phenomenon similar to the Electrical Double Layer (EDL) will be generated between the liquid gallium and the electrolyte, thus it can be regarded as a variable capacitor. In addition, after the liquid gallium is controlled by the voltage, the surface area is changed greatly, thus the resistance is also changed. Summarized from the above description, the invention employs the principle of electrowetting and electrocapillary to control the expansion and contraction of liquid gallium 204 in order to form the characteristics of electrical control light valve apparatus.

In addition, Ga has a melting point of 37.5° C., which is higher than the room temperature (27° C.). However, the backlighting system will heat up the display, so that the temperature usually can reach 45° C. inside the conventional display. Therefore, the Ga droplet is in liquid form when operating the device.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An electrical control light valve apparatus having liquid gallium metal, comprising:
    a bottom flat plate, the bottom flat plate being a transparent glass;
    a transparent conductive film being used as a positive electrode (anode) that is located on a top of the bottom flat plate;
    another conductive electrode film being used as a negative electrode (cathode) that is located on the top of the bottom flat plate;
    a transparent conductive solution being injected between the bottom flat plate and a top flat plate, the transparent conductive solution being selected from the group consisting of $H_2SO_4$, and HCl;
    a liquid gallium metal being placed on the cathode transparent conductive film, the liquid gallium metal having a round sphere when a voltage being not applied, and the liquid gallium metal having expanding as like a film when the voltage being applied; and
    a top flat plate being placed on the top of the transparent conductive solution to form the electrical control light valve apparatus having the liquid gallium metal.

* * * * *